(12) United States Patent
Kakarlapudi

(10) Patent No.: US 10,803,547 B2
(45) Date of Patent: Oct. 13, 2020

(54) GRAPHICS PROCESSING SYSTEMS USING A SUBSET OF PIPELINE STAGES

(71) Applicant: Arm Limited, Cambridge (GB)

(72) Inventor: Sandeep Kakarlapudi, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/804,784

(22) Filed: Nov. 6, 2017

(65) Prior Publication Data
US 2018/0144437 A1 May 24, 2018

(30) Foreign Application Priority Data

Nov. 18, 2016 (GB) .................................. 1619569.5

(51) Int. Cl.
| | | |
|---|---|---|
| *G06T 1/20* | (2006.01) | |
| *G06T 15/00* | (2011.01) | |
| *G09G 5/36* | (2006.01) | |
| *G09G 5/395* | (2006.01) | |
| *G06F 9/44* | (2018.01) | |

(Continued)

(52) U.S. Cl.
CPC .............. *G06T 1/20* (2013.01); *G06F 3/012* (2013.01); *G06F 9/44* (2013.01); *G06F 9/4411* (2013.01); *G06T 15/005* (2013.01); *G06T 17/10* (2013.01); *G09G 5/026* (2013.01); *G09G 5/363* (2013.01); *G09G 5/395* (2013.01); *G06T 2200/28* (2013.01); *G06T 2215/16* (2013.01); *G09G 2360/18* (2013.01)

(58) Field of Classification Search
None
See application file for complete search history.

(56) References Cited

U.S. PATENT DOCUMENTS

| | | | |
|---|---|---|---|
| 5,867,167 A | 2/1999 | Deering | |
| 5,999,189 A | 12/1999 | Kajiya | |
| (Continued) | | | |

FOREIGN PATENT DOCUMENTS

| | | |
|---|---|---|
| EP | 0959431 | 8/1996 |
| GB | 2537034 | 10/2016 |
| (Continued) | | |

OTHER PUBLICATIONS

GB Combined Search and Examination Report dated May 19, 2017, GB Patent Application No. GB1619569.5.

(Continued)

*Primary Examiner* — Joni Hsu
(74) *Attorney, Agent, or Firm* — Vierra Magen Marcus LLP

(57) ABSTRACT

In a graphics processing system, an application executing on a host processor can request graphics processing operations that are to be performed by only subsets of the set of stages of a graphics processing pipeline implemented by a graphics processor. In response to such a request, the driver for the graphics processor causes the graphics processing operation that is to be performed using only a subset of the set of stages of the graphics processing pipeline to be performed. The driver can cause the graphics processing operation that is to be performed by the subset of stages of the graphics processing pipeline to be performed by the graphics processor, or on the host processor.

12 Claims, 8 Drawing Sheets

(51) Int. Cl.
*G06F 9/4401* (2018.01)
*G09G 5/02* (2006.01)
*G06F 3/01* (2006.01)
*G06T 17/10* (2006.01)

(56) References Cited

U.S. PATENT DOCUMENTS

| | | | |
|---|---|---|---|
| 6,717,578 B1 | 4/2004 | Deering | |
| 7,659,893 B1 | 2/2010 | Oberman | |
| 7,932,914 B1 | 4/2011 | Geiss | |
| 9,865,065 B2 | 1/2018 | Harris | |
| 2002/0050992 A1 | 5/2002 | Deering | |
| 2005/0174345 A1 | 8/2005 | Wittenbrink | |
| 2008/0143720 A1* | 6/2008 | Elmquist | G06T 15/50 345/426 |
| 2008/0198168 A1* | 8/2008 | Jiao | G06T 15/005 345/506 |
| 2012/0293545 A1 | 11/2012 | Engh-Halstvedt | |
| 2013/0141445 A1* | 6/2013 | Engh-Halstvedt | G06T 5/002 345/506 |
| 2014/0327671 A1* | 11/2014 | Nystad | G06T 15/005 345/426 |
| 2014/0362100 A1 | 12/2014 | Cerny | |
| 2015/0154733 A1 | 6/2015 | Amsinck | |
| 2016/0035129 A1* | 2/2016 | Bolz | G06T 15/005 345/420 |
| 2017/0124757 A1* | 5/2017 | Sathe | G06T 15/005 |
| 2017/0213312 A1* | 7/2017 | Woo | G06T 1/20 |
| 2017/0243319 A1* | 8/2017 | Wittenbrink | G06F 9/451 |

FOREIGN PATENT DOCUMENTS

| | | |
|---|---|---|
| WO | WO 00/33183 | 6/2000 |
| WO | 2005/059837 | 6/2005 |

OTHER PUBLICATIONS

GB Search Report dated Aug. 1, 2016, GB Patent Application No. GB1603182.5.
GB Search Report dated Aug. 17, 2015, GB Patent Application No. GB1503125.5.
Mammen et al., "Transparency and antialiasing algorithms implemented with virtual pixel maps technique", Computer Graphics and Applications, IEEE, vol. 9, Issue 4, pp. 43-55, Jul. 1989.
Vaidyanathan et al., "Coarse Pixel Shading", High Performance Graphics 2014, Jun. 2014.
Wexter et al., "GPU-Accelerated High-Quality Hidden Surface Removal", HWWS '05 Proceedings of the ACM SIGGRAPH/ EUROGRAPHICS conference on Graphics Hardware, Jul. 2005.

* cited by examiner

GRAPHICS PROCESSING SYSTEMS USING A SUBSET OF PIPELINE STAGES

BACKGROUND

The technology described herein relates to graphics processing systems, and in particular to the control and addressing of the graphics processing pipeline in a graphics processing system.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

Graphics processing is typically carried out in a pipelined fashion, with one or more pipeline stages operating on the data to generate the final render output, e.g. frame that is displayed.

FIG. 1 shows an exemplary graphics processing pipeline. As shown in FIG. 1, the pipeline 1 takes as its inputs vertex data 2, such as vertex positions and attributes. The first stage in the pipeline is then to subject that vertex data to appropriate vertex shading operations 3. Once the vertex shading is completed, primitive processing 4, such as primitive setup and assembly operations, back face culling, and/or clipping (if performed), is performed, potentially using primitive data 5 (e.g. indicating which vertices form which primitives) as further input data.

Once the primitive processing is completed, the so-generated primitives are then rasterised 6 to generate graphics fragments for processing. The so-generated graphics fragments are then subjected to appropriate fragment processing 7, such as per-fragment tests (e.g. depth and stencil tests), fragment shading (rendering), etc. Any necessary blending 8 is then performed and the resulting fragment data is written out to an output frame buffer 9 in memory.

FIG. 2 shows an exemplary graphics processing pipeline 1 in more detail.

The graphics processing pipeline 1 shown in FIG. 2 is a tile-based renderer and will thus produce tiles of a render output data array, such as an output frame to be generated.

FIGS. 1 and 2 show the main elements and pipeline stages of the graphics processing pipeline. As will be appreciated by those skilled in the art, there may be other elements of the graphics processing pipeline that are not illustrated in FIGS. 1 and 2. It should also be noted here that FIGS. 1 and 2 are only schematic, and that, for example, in practice the shown functional units and pipeline stages may share significant hardware circuits, even though they are shown schematically as separate stages in FIGS. 1 and 2. It will also be appreciated that each of the stages, elements and units, etc., of the graphics processing pipeline as shown in FIGS. 1 and 2 may be implemented as desired and will accordingly comprise, e.g., appropriate circuitry and/or processing logic, etc., for performing the necessary operation and functions.

The graphics processing pipeline 1 shown in FIG. 2 includes a number of stages, including vertex shader 20, a hull shader 21, a tesselator 22, a domain shader 23, a geometry shader 24, a tiler 25, a rasterisation stage 26, an early Z (depth) and stencil test stage 27, a renderer in the form of a fragment shading stage 28, a late Z (depth) and stencil test stage 29, a blending stage 210, a tile buffer 211 and a downsampling and writeout (multisample resolve) stage 212.

The vertex shader 20 takes the input data values (vertex attribute values) associated with the vertices, etc., defined for the output to be generated, and processes those data values to generate a set of corresponding "vertex shaded" output data values for use by subsequent stages of the graphics processing pipeline 1.

For a given output to be generated by the graphics processing pipeline, there will typically be a set of vertices defined for the output in question. The primitives to be processed for the output will then be indicated as comprising given vertices in the set of vertices for the graphics processing output being generated.

The vertex shading operation operates to transform the attributes for each vertex into a desired form for the subsequent graphics processing operations. This may comprise, for example, transforming vertex position attribute values from the world or user space that they are initially defined for to the screen space that the output of the graphics processing system is to be displayed in, modifying the input data to take account of the effect of lighting in the image to be rendered, etc.

The hull shader 21 performs operations on sets of patch control points and generates additional data known as patch constants. The tessellation stage 22 subdivides geometry to create higher-order representations of the hull, and the domain shader 23 performs operations on vertices output by the tessellation stage (similar to a vertex shader). The geometry shader 24 processes entire primitives such as a triangles, points or lines.

These "primitive processing" stages together with the vertex shader 20 effectively perform all the necessary fragment frontend operations, such as transformation and lighting operations, and primitive setup, to setup the primitives to be rendered, in response to commands and vertex data provided to the graphics processing pipeline 1.

Once all the primitives to be rendered have been appropriately set up, the tiler 25 then determines which primitives need to be processed for each tile that the render output has been divided into for processing purposes. To do this, the tiler 25 compares the location of each primitive to be processed with the tile positions, and adds the primitive to a respective primitive list for each tile that it determines the primitive could (potentially) fall within. Any suitable and desired technique for sorting and binning primitives into tile lists, such as exact binning, or bounding box binning or anything in between, can be used for the tiling process.

Once the tiler has completed the preparation of the primitive tile lists (lists of primitives to be processed for each tile), then each tile can be rendered.

To do this, each tile is processed by the graphics processing pipeline stages shown in FIG. 2 that follow the tiler 25.

Thus, when a given tile is being processed, each primitive that is to be processed for that tile (that is listed in a tile list for that tile) is passed to the rasteriser 26.

The rasterisation stage 26 of the graphics processing pipeline 1 operates to rasterise the primitives into individual graphics fragments for processing. To do this, the rasteriser 26 rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 27 performs a Z (depth) test on fragments it receives from the rasteriser 26, to see if any fragments can be discarded (culled) at this stage. To do this, it compares the depth values of (associated with) fragments issuing from the rasteriser 26 with the depth values of fragments that have already been rendered (these depth values are stored in a depth (Z) buffer that is part of the tile buffer 211) to determine whether the new fragments will be occluded by fragments that have already been rendered (or not). At the same time, an early stencil test is carried out.

Fragments that pass the fragment early Z and stencil test stage 27 are then sent to the fragment shading stage 28. The fragment shading stage 28 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 28 is in the form of a shader pipeline (a programmable fragment shader).

There is then a "late" fragment Z and stencil test stage 29, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 211 to determine whether the fragment data for the new fragments should replace the fragment data of the fragments that have already been rendered, by comparing the depth values of (associated with) fragments issuing from the fragment shading stage 28 with the depth values of fragments that have already been rendered (as stored in the depth buffer). This late fragment depth and stencil test stage 29 also carries out any necessary "late" alpha and/or stencil tests on the fragments.

The fragments that pass the late fragment test stage 29 are then subjected to, if required, any necessary blending operations with fragments already stored in the tile buffer 211 in the blender 210. Any other remaining operations necessary on the fragments, such as dither, etc. (not shown) are also carried out at this stage.

Finally, the (blended) output fragment data (values) are written to the tile buffer 211 from where they can, for example, be output to a frame buffer 213 for display. The depth value for an output fragment is also written appropriately to a Z-buffer within the tile buffer 211. (The tile buffer stores colour and depth buffers that store an appropriate colour, etc., or Z-value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 211 is input to a downsampling (multisample resolve) write out unit 212, and thence output (written back) to an external memory output buffer, such as a frame buffer 213 of a display device (not shown). (The display device could comprise, e.g., a display comprising an array of pixels, such as a computer monitor or a printer.)

The downsampling and writeout unit 212 downsamples the fragment data stored in the tile buffer 211 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer 213 in a main memory) for storage, the next tile is then processed, and so on, until sufficient tiles have been processed to generate the entire render output (e.g. frame (image) to be displayed). The process is then repeated for the next render output (e.g. frame) and so on.

Other arrangements for a graphics processing pipeline would, of course, be possible.

The graphics processing pipeline as illustrated in, e.g., FIGS. 1 and 2, will be executed on and implemented by an appropriate graphics processing unit (GPU) (graphics processor) that includes the necessary functional units, processing circuitry, etc., operable to execute the graphics processing pipeline stages.

In order to control a graphics processor (graphics processing unit) that is implementing a graphics processing pipeline to perform the desired graphics processing pipeline operations, the graphics processor will typically receive commands and data from a driver, e.g. executing on the host processor, that indicates to the graphics processor the operations that it is to carry out and the data to be used for those operations.

Accordingly, as shown in FIG. 3 (which shows a typical computer graphics processing system), an application 32, such as a game, executing on a host processor 31 that requires graphics processing operations to be performed by an associated graphics processing unit (graphics processing pipeline) 33, will generate appropriate API (Application Programming Interface) calls that are interpreted by a driver 34 for the graphics processor 33 that is running on the host processor 31 to generate appropriate instructions to the graphics processor 33 to generate graphics output required by the application 32. To facilitate this, a set of instructions will be provided to the graphics processor 33 in response to instructions from the application 32 running on the host system 31 for graphics output (e.g. to generate a frame to be displayed).

As can be seen from FIGS. 1 and 2, a graphics processing pipeline 1 may include a number of programmable processing or "shader" stages, such as the vertex shader 20, hull shader 21, domain shader 23, geometry shader 24, and the fragment shader 28. These programmable shader stages execute respective shader programs that have one or more input variables and generate sets of output variables. Typically the shader program in question will be executed for each work item (e.g. vertex in the case of a vertex shader) to be processed. Typically an execution thread will be issued for each work item to be processed, and the thread will then execute the instructions in the shader program to produce the desired "shaded" output data.

The application 32 that requires the graphics processing typically provides the shader programs to be executed using a high-level shader programming language, such as GLSL, HLSL, OpenCL, etc. These shader programs are then translated by a shader language compiler to binary code for the target graphics processing pipeline. This may include the creation of one or more internal (intermediate) representations of the program within the compiler. (The compiler may, e.g., be part of the driver 34, with there being a special API call to cause the compiler to run. The compiler execution can thus be seen as being part of the, e.g. draw call preparation done by the driver in response to API calls generated by an application).

The Applicants believe there remains scope for improvements to the operation of graphics processing systems and graphics processing pipelines of graphics processing systems.

BRIEF DESCRIPTION OF THE DRAWINGS

Embodiments of the technology described herein will now be described by way of example only and with reference to the accompanying drawings, in which.

Like reference numerals are used for like features throughout the drawings, where appropriate.

DETAILED DESCRIPTION

Figure 1:
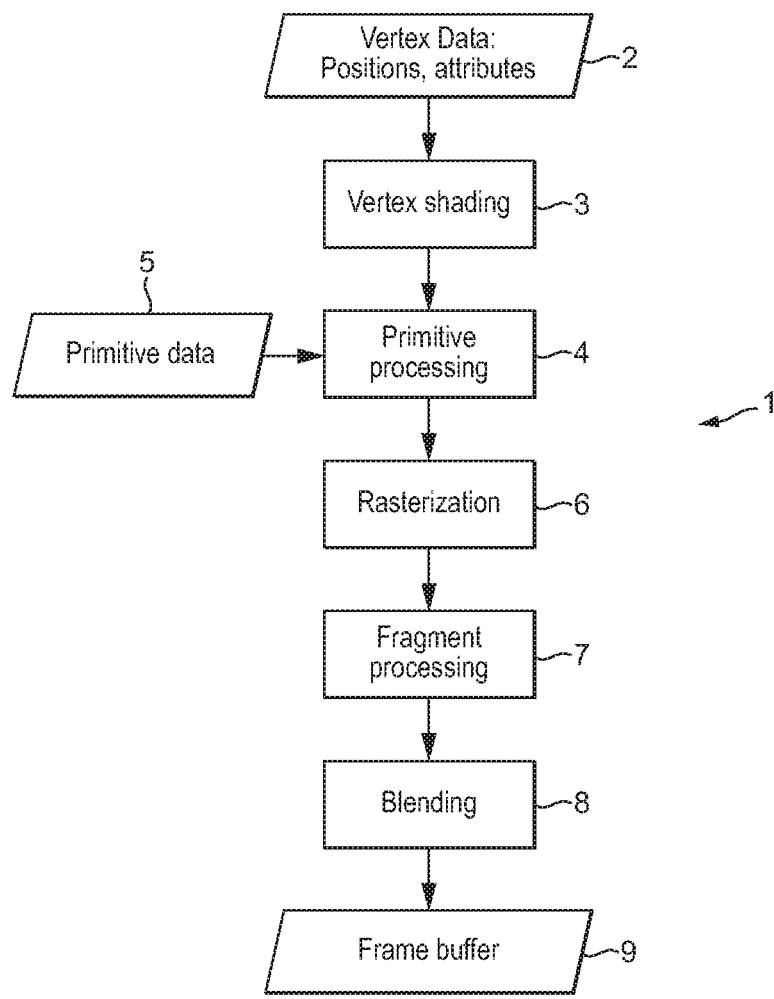
FIGS. 1 and 2 show exemplary graphics processing pipelines that can be operated in the manner of the technology described herein.

A first embodiment of the technology described herein comprises a method of operating a graphics processing system, which graphics processing system includes:

a host processor operable to execute applications that require graphics processing;

a graphics processor, the graphics processor operable to execute a graphics processing pipeline that comprises a set of plural graphics processing stages;

wherein the host processor executes a driver for the graphics processor, the driver being operable to, in response to requests for graphics processing received from an application executing on the host processor, provide commands and data to the graphics processor to control the graphics processor to perform graphics processing operations;

the method comprising:

an application executing on the host processor issuing a request for a graphics processing operation that is to be performed by only a subset of the set of stages of the graphics processing pipeline implemented by the graphics processor; and the driver in response to such a request from an application executing on the host processor, causing the graphics processing operation that is to be performed using only a subset of the set of stages of the graphics processing pipeline to be performed.

A second embodiment of the technology described herein comprises a graphics processing system comprising:

a host processor operable to execute applications that require graphics processing; and a graphics processor, the graphics processor operable to execute a graphics processing pipeline that comprises a set of plural graphics processing stages; and wherein:

the host processor is operable to execute a driver for the graphics processor, the driver being operable to, in response to requests for graphics processing received from an application executing on the host processor, provide commands and data to the graphics processor to control the graphics processor to perform graphics processing operations;

and the driver is further operable to:

in response to a request from an application executing on the host processor for a graphics processing operation that is to be performed by only a subset of the set of stages of the graphics processing pipeline implemented by the graphics processor:

cause the graphics processing operation that is to be performed using only a subset of the set of stages of the graphics processing pipeline to be performed.

In the technology described herein, an application that requires graphics processing is able to trigger and request a graphics processing operation that is performed using only a subset of the stages of the overall graphics processing pipeline. This is in contrast to existing graphics processing systems where an application would simply be able to address the graphics processing pipeline as a whole.

As will be discussed further below, the technology described herein accordingly in effect "decouples" the graphics processing pipeline into one or more different parts (subsets of processing stages), some or all of which can be independently addressed and activated by an application that requires graphics processing.

As will be discussed further below, the Applicants have recognised that there would be advantages in allowing applications that require graphics processing to be able to trigger and control graphics processing operations that are performed by a subset or subsets of a graphics processing pipeline only, rather than being constrained to only being able to trigger and control the operation of a graphics processing pipeline as a whole.

For example, this can facilitate and provide a number of advantages when performing graphics processing, for example in terms of the use of graphics processing resources and/or latency when performing graphics processing. For example, as will be discussed further below, the technology described herein can facilitate a reduction in the latency when performing so-called "time warp" rendering for virtual reality displays, in particular, in tile-based graphics processing systems.

The set of stages of the graphics processing pipeline in the graphics processing system of the technology described herein can comprise any suitable and desired set of stages that a graphics processing pipeline may, and/or typically would, include.

In an embodiment, the set of stages includes at least a rasteriser that rasterises input primitives to generate graphics fragments to be processed and a renderer that renders graphics fragments generated by the rasteriser to provide rendered fragment data for the graphics fragments.

In an embodiment, the set of stages of the graphics processing pipeline comprises one or more of, and in an embodiment all of: a vertex shading stage, a primitive processing stage, a rasterisation stage, a fragment processing stage, and a blending stage.

The primitive processing stage in an embodiment comprises a primitive assembly stage. The primitive processing stage in an embodiment also includes a geometry shading stage. It may also comprise a clipping and/or perspective divide stage and a viewport transformation stage. The fragment processing stage in an embodiment comprises one or more fragment test stages (e.g. depth test stages), and/or a fragment shading stage.

In an embodiment, the set of stages also includes a tiling stage, which in an embodiment comes between the primitive processing stage and the rasterisation stage.

In an embodiment, the set of stages of the graphics processing pipeline in an embodiment comprises plural of, and in an embodiment each of:

a vertex shader, a hull shader, a tessellator, a domain shader, a geometry shader, a tiler (in the case of a tile-based graphics processing pipeline), a rasteriser, an early depth and stencil tester, a fragment shader, a late depth and stencil tester, a blender, a tile buffer (in the case of a tile-based graphics processing pipeline), and a write-out unit.

The graphics processor may be operable to execute (perform the processing operations for) a set of plural graphics processing stages making up the graphics processing pipeline in any suitable and desired manner. It in an embodiment comprises appropriate processing circuitry that is operable to perform the processing operations of the stages of the graphics processing pipeline. That processing circuitry may, e.g., be fixed function and/or programmable and the graphics processing stages may be provided by their own separate processing circuitry, and/or two or more of the graphics processing stages may share processing circuitry (e.g. be implemented by appropriately programming shared programmable processing circuitry). Other arrangements would, of course, be possible.

The overall set of stages of the graphics processing pipeline can be divided into subsets for operation in the manner of the technology described herein in any suitable and desired manner. While it would be possible to be able to divide the graphics processing pipeline into subsets of stages in a fully flexible manner, in an embodiment, the graphics processing pipeline is divided into one or more particular, in an embodiment predefined, subsets of stages that can then be independently addressed and activated by an application. This helps to facilitate the operation in the manner of the technology described herein.

Thus, in an embodiment, an application is, in effect, presented with, and can address and control independently, one or more, and in an embodiment plural, explicit and predefined subsets of stages of the graphics processing pipeline.

The overall set of stages of the graphics processing pipeline will form a sequence of stages that are, in an embodiment, to be performed in their sequence order, in order to execute the overall operation of the graphics processing pipeline. The subset of stages that the graphics processing pipeline is divided into (or each subset of stages that the graphics processing pipeline is divided into) correspondingly in an embodiment comprises a respective sequence of some (but not all) of the stages of the graphics processing pipeline (in the sequence order of the stages in the graphics processing pipeline).

In one embodiment, a, and in an embodiment one or more, subset of stages comprises a contiguous sequence of plural successive stages of the sequence (set) of stages of the graphics processing pipeline (i.e. such that the operation that is performed by that subset of stages uses all of the stages in the subset, in contrast, e.g., to an operation which uses one or more stages of the graphics processing pipeline, then omits other stages of the graphics processing pipeline, and is then continued by further stages of the graphics processing pipeline (in the sequence of stages of the graphics processing pipeline)).

In one embodiment, a, and in an embodiment one or more, subset of stages comprises some but not all of the stages of a contiguous sequence of plural successive stages of the sequence (set) of stages of the graphics processing pipeline (i.e. such that the operation that is performed by that subset of stages uses some but not all of the stages in the sequence of stages, e.g., uses one or more stages of the graphics processing pipeline, then skips (omits) one or more stages of the sequence of stages of the graphics processing pipeline, and then uses further stages of the sequence of stages of the graphics processing pipeline).

The set of stages of the graphics processing pipeline can be divided into any desired number of subsets for the purposes of the operation in the manner of the technology described herein. Thus there may, for example, be only a single subset of processing stages that can be addressed and controlled independently by an application (together with the entire graphics processing pipeline). In an embodiment there are plural subsets of stages that may be independently addressable and controllable.

Thus, in an embodiment, an application executing on the host processor can issue a request for one of plural graphics processing operations that are to be performed by respective subsets of the set of stages of the graphics processing pipeline implemented by the graphics processor, and the driver is operable to identify which graphics processing operation to be performed by only a subset of the set of stages of the graphics processing pipeline has been requested by an application, and to then cause that graphics processing operation to be performed. In an embodiment an application can, and in an embodiment does, issue plural requests for respective graphics processing operations that are to be performed by respective subsets of the set of stages of the graphics processing pipeline.

Each subset of stages may comprise only a single graphics processing pipeline stage, but in an embodiment comprises plural stages of the set of stages of the graphics processing pipeline.

In an embodiment, the graphics processing pipeline is divided into two separately addressable and controllable subsets of stages (i.e. an application can address and control two different subsets of stages of the graphics processing pipeline independently).

An application should also be able to and in an embodiment can, address and control the complete set of stages of the graphics processing pipeline (i.e. the graphics processing pipeline as a whole), as well as being able to address and control respective subsets of stages of the graphics processing pipeline.

The set of stages of the graphics processing pipeline may be divided into overlapping subsets of stages, if desired. However, in an embodiment each subset of stages comprises a completely different subset (and sequence) of stages, i.e. the set of stages of the graphics processing pipeline is divided into plural (e.g. two) non-overlapping subsets (sequences) of stages.

In an embodiment, the set of stages for the graphics processing pipeline is (at least) divided into a subset of stages that comprises stages that perform fragment processing operations in the graphics processing pipeline. Correspondingly, in an embodiment, there is a subset of stages of the graphics processing pipeline that an application can address and control independently that comprises stages of the graphics processing pipeline up to (but not including) any fragment processing stages of the graphics processing pipeline. This subset of stages in an embodiment comprises stages of the graphics processing that perform geometry processing and/or primitive processing of the graphics processing pipeline, but no fragment processing stages of the graphics processing pipeline.

In an embodiment, the set of stages of the graphics processing pipeline is divided into two addressable and controllable subsets of stages at the primitive assembly stage of the graphics processing pipeline. In this case, the first subset of stages in an embodiment comprises some or all of the (sequence of) stages up to (but not including) the primitive assembly stage, and the second subset of stages comprises some or all (and in an embodiment all) of the (sequence of) stages from (and including) the primitive assembly stage onwards.

In another embodiment, the graphics processing pipeline is divided into two subsets at (just before) the clipping and perspective divide stage. In this case, the first subset of stages will comprise some or all of the (sequence of) stages up to (but not including) the clipping and perspective divide stage of the graphics processing pipeline, with the second subset of stages comprising the clipping and perspective divide stage and some or all (and in an embodiment all) of the (sequence of) stages of the graphics processing pipeline thereafter.

In an embodiment of these arrangements, the first subset (sequence) of stages does not comprise all of the stages up to (but not including) the primitive assembly or clipping perspective divide stage, but only includes some of those stages. In an embodiment, that first subset of stages does not include one or more vertex processing stages but comprises stages that will use processed vertex positions to, e.g., and in an embodiment, then perform primitive processing using those vertex positions. In this case the vertex processing could, e.g., be performed by the application that requires the graphics processing (and in an embodiment, that is what is done).

Correspondingly, it need not be the case that the different subsets of the set of stages for the graphics processing pipeline that can be used in the technology described herein together comprise all the stages of the set of stages of the graphics processing pipeline. They may instead together comprise only some but not all of the set of stages for the graphics processing pipeline.

In an embodiment, the graphics processing pipeline is a tile-based graphics processing pipeline and the set of stages of the graphics processing pipeline is divided into a first subset (sequence) of stages that perform some or all of the necessary graphics processing operations up to and including the derivation of the tile lists for a render output being generated, and a second subset (sequence) of stages that is operable to use tile lists generated by the first subset of stages to produce a render output. Thus, in this case, the first subset of stages in an embodiment includes some or all of the stages of the graphics processing pipeline up to and including the primitive processing and the tile list preparation, and the second subset of processing stages in an embodiment includes some or all (and in an embodiment all) of the stages from (and including) the rasterisation stage onwards.

Again, in this arrangement, in an embodiment the first subset of stages is operable to receive as an input processed vertex positions that are provided, e.g., and in an embodiment, by the application that requires the graphics processing, and then includes stages that will use those processed vertex positions to perform primitive processing and the tile list preparation. Thus, the first subset of stages will only include some of the stages of the graphics processing pipeline up to and including the primitive processing and tile lists preparation (the tiler), and in particular, in an embodiment does not include a vertex (position) processing stage or stages.

An application can control and trigger the performance of a graphics processing operation by a subset of stages of the graphics processing pipeline in any suitable and desired manner. In an embodiment an application can control which subset of stages of the graphics processing pipeline are executed and when, and at what frequency, independently of other sets of subsets of stages of the graphics processing pipeline.

In an embodiment, an application can indicate the subset of stages that is to perform the graphics processing operation and the graphics processing operation that is to be performed.

In an embodiment, an application can also or instead (and in an embodiment also) specify when the graphics processing operation to be performed by the subset of stages is to be performed. In one such embodiment, an application can specify an event that triggers the performance of the graphics processing operation that is to be performed using the subset of the set of stages of the graphics processing pipeline. Any suitable and desired event or events can be used for this purpose. In an embodiment, the event or events that an application can specify in this regard comprise one or more of, and in an embodiment all of: a user input (the receipt of a user input); and a specified time, in an embodiment in terms of the system time, (which time may be defined in absolute terms, or relative, e.g., to another event occurring).

Thus, in a an embodiment, an application executing on the host processor can specify when the graphics processing operation that is to be performed using only a subset of stages of the graphics processing pipeline is to be performed (should be performed (started)).

Thus, in an embodiment, an application can, and in an embodiment does, include with its request for a graphics processing operation that is to be performed by only a subset of the set of stages of the graphics processing pipeline implemented by the graphics processor, an indication of when that graphics processing operation is to be performed (e.g., and in an embodiment, in terms of an event that will trigger the performance of the graphics processing operation).

The driver is correspondingly in an embodiment operable to identify from a request when the graphics processing operation is to be performed, to track and/or identify when the time for performing the graphics processing operation has been reached (e.g., and in an embodiment, to track and/or identify when the event that triggers the performance of the graphics processing operation has occurred), and to then cause the graphics processing operation that is to be performed using only a subset of the set of stages of the graphics processing pipeline to be performed in response to the "start" point (time) being reached (e.g. triggering event occurring).

In an embodiment an application can indicate (and thus explicitly control) how many times a graphics processing operation that is to be performed by only a subset of the set of stages of the graphics processing pipeline implemented by the graphics processor is to be performed (how many times the subset of stages is "run"). In an embodiment an application can, and in an embodiment does, request that a graphics processing operation that is to be performed by only a subset of the set of stages of the graphics processing pipeline implemented by the graphics processor is performed plural times, e.g., and in an embodiment, using a new (and in an embodiment different) set of input data each time. This is in an embodiment done by the application issuing plural requests for the graphics processing operation to be performed.

In an embodiment an application can indicate (request) that a graphics processing operation that is to be performed by only a subset of the set of stages of the graphics processing pipeline implemented by the graphics processor is to be performed again (after the graphics processing operation has already been performed (at least once)), e.g., and in an embodiment, using a new (and in an embodiment different) set of input data (to the previous time the operation was performed).

In this case, the system could be configured, e.g., such that an application will only (e.g. can only) submit a request that the operation is performed again (e.g. submit the request to the driver) after the new set of input data is available. In this case, the application would indicate the graphics processing operation should be performed again only after the input data for the operation becomes available (e.g. has been provided (generated)).

Alternatively or additionally, an application could, and in an embodiment does, indicate that a graphics processing operation should be performed again, but with the performance of that operation to be (and being) deferred until a new set of input data for the operation is available. Thus, in an embodiment, an application can indicate that a graphics processing operation should be performed, but only once input data for the operation has been provided (generated).

For example, and in an embodiment, a request for the graphics processing operation could indicate an event (namely (new) input data becoming available) that must be met before the graphics processing operation is performed. In this case therefore the, e.g. driver, would wait until the particular event occurs (is signalled) before triggering the graphics processing operation. The triggering event could, e.g., be the writing of new data into a buffer that is to be used as an input by the graphics processing operation. In this case, the application could, e.g., signal the event that triggers the performance of the graphics processing operation once it has written new (e.g. different) data into an appropriate input buffer or buffers for the graphics processing operation.

Thus, in an embodiment, an application can, and in an embodiment does, make a first request for a graphics processing operation that is to be performed by only a subset of the set of stages of the graphics processing pipeline implemented by the graphics processor, and then make a second request for that graphics processing operation that is to be performed by only a subset of the set of stages of the graphics processing pipeline implemented by the graphics processor to be performed again.

The driver is correspondingly in an embodiment operable to cause the graphics processing operation that is to be performed using only a subset of the set of stages of the graphics processing pipeline to be performed the requested number of times. In an embodiment the driver is operable to cause a graphics processing operation that is to be performed using only a subset of the set of stages of the graphics processing pipeline to be performed once in response to a first request from an application for that graphics processing operation that is to be performed by only a subset of the set of stages of the graphics processing pipeline implemented by the graphics processor; and to then cause the graphics processing operation that is to be performed using only a subset of the set of stages of the graphics processing pipeline to be performed again, in response to a second request by the application for that graphics processing operation to be performed.

In one such embodiment, an application can, and in an embodiment does, request two (or more) graphics processing operations that are each to be performed by respective different subsets of the set of stages of the graphics processing pipeline, and requests that plural (and in an embodiment each) of the different graphics processing operations is performed a different number of times to another one or ones of the requested graphics processing operations (and the driver causes the graphics processing operations to be performed accordingly).

In one such embodiment, a first graphics processing operation that is to be performed by only a subset of the set of stages of the graphics processing pipeline is performed once, and a second graphics processing operation that is performed by a different subset of the set of stages of the graphics processing pipeline is performed plural times, e.g., and in an embodiment, using the output from the first graphics processing operation that is performed only once.

In an embodiment, the data (the input data) that is to be processed by the graphics processing operation by the subset of stages of the graphics processing pipeline can be (and is in an embodiment) indicated by the application requesting the graphics processing pipeline. This may be, e.g., and is in an embodiment, done by specifying appropriate input buffers, etc., to be used by the subset of stages of the graphics processing pipeline for the graphics processing operation.

Correspondingly, in an embodiment, an application can indicate where the output (the result) of the graphic processing operation by the subset of stages of the graphics processing pipeline should be stored and/or provided to. Again, this can in an embodiment (and is in an embodiment) done by specifying an appropriate output buffer or buffers where the results of the processing operation are to be stored.

In an embodiment, it can be specified that the result of graphics processing operation by one (by a first) subset of stages of the graphics processing pipeline is to be used as an input by (is to be processed by) another (by a second) subset of stages of the graphics processing pipeline.

Thus, in an embodiment, an application can specify which inputs are to be consumed by a given subset of stages of the graphics processing pipeline, and can specify how and where the results from the processing of the subset of stages from the graphics processing pipeline should be stored.

The functionality of an application executing on a host processor being able to request and control graphics processing operations to be performed using a subset of the stages of a graphics processing pipeline only can be implemented and performed in any suitable and desired manner.

In an embodiment, this is achieved by allowing an application to issue (and by an application issuing) appropriate API (Application Programming Interface) calls (function calls) to trigger the operation in the manner of the technology described herein. In an embodiment, there are one or more particular, in an embodiment predefined, API calls that an application can use, and that are configured to trigger and control the operation in the manner of the technology described herein (and that will be recognised by a graphics processor driver to trigger and control the operation in the manner of the technology described herein).

Thus, in an embodiment, the application program interface for the graphics processor (and graphics processing pipeline) includes the ability to indicate and control the performance of graphics processing operations by the desired subsets of the stages of the graphics processing pipeline only. This will then allow, for example, and in an embodiment, an application programmer to include appropriate function calls, etc., in an application program to trigger operation in the manner of the technology described herein (when desired). This will accordingly allow an application programmer to view and treat a graphics processing pipeline as plural subsets of stages, rather than having to treat and see the graphics processing pipeline simply as a whole.

Such API calls, etc., can be provided as desired, e.g., and in an embodiment, as an extension to existing graphics APIs (Application Programming Interfaces).

Correspondingly, in an embodiment, the driver for the graphics processor that is implementing the graphics processing pipeline is configured to recognise (API) calls from an application for graphics processing in the manner of the technology described herein, and to accordingly submit appropriate commands and data to the graphics processor to trigger a graphics processing operation by a subset of the stages of the graphics processing pipeline only.

Thus, in an embodiment, the method of the technology described herein comprises (and the graphics processing system is configured to):

an application executing on the host processor issuing a graphics API call or calls to request a graphics processing operation that is to be performed by a subset of the stages of the graphics processing pipeline only; and the driver for the graphics processor executing on the host processor recognising the API call or calls and causing the graphics processing operation that is to be performed by the subset of stages of the graphics processing pipeline only to be performed.

The driver that is executing on the host processor can cause the graphics processing operation that is to be performed by the subset of stages of the set of stages of the graphics processing pipeline to be performed in any suitable and desired manner.

In one embodiment, the graphics processing operation to be performed by the subset of stages is performed by that subset of stages on the graphics processor. In this case, the driver should, and in an embodiment does send appropriate commands and data to the graphics processor to cause the graphics processor to perform the processing operation that is to be performed by the subset of stages of the graphics processing pipeline.

Thus, in an embodiment, the method of the technology described herein comprises (and the graphics processing system is configured to):

an application executing on the host processor requesting (e.g. issuing a graphics API call or calls to request) a graphics processing operation that is to be performed by a subset of the stages of the graphics processing pipeline only; and the driver for the graphics processor executing on the host processor recognising the request (e.g. the API call or calls) and issuing commands and data to the graphics processor to cause the graphics processor to perform the processing operation that is to be performed by the subset of stages of the graphics processing pipeline.

Where the graphics processor is to perform the processing operation that is to be performed by a subset of stages of the graphics processing pipeline, then the graphics processor should, and in an embodiment does, perform that processing operation using (only) the indicated subset of stages of the graphics processing pipeline (i.e. such that the entire graphics processing pipeline that is implemented by the graphics processor will not be activated when performing the graphics processing operation, but rather only the indicated subset of stages for the graphics processing operation will be activated to perform the graphics processing operation).

However, because the technology described herein allows different subsets of stages of the graphics processing pipeline to be controlled to perform graphics processing operations independently of each other, that also allows a given graphics processing operation that is to be performed by a subset of stages only to not necessarily be performed (to be other than performed) on the graphics processor itself, but to instead be performed, e.g., on the host processor, rather than on the graphics processor itself. Indeed, it is an advantage of the technology described herein that it facilitates performing graphics processing operations using subsets of the stages of a graphics processing pipeline elsewhere than on the graphics processor itself, for example, and in an embodiment, on a host processor.

Thus, in an embodiment, the driver causes the graphics processing operation that is to be performed by the subset of stages of the set of stages of the graphics processing pipeline to be performed on the host processor (and not on the graphics processor). This can be done in any suitable and desired manner, for example, by executing the relevant graphics processing operations in software on the host processor.

Thus, in an embodiment, the method of the technology described herein comprises (and the graphics processing system is configured to):

an application executing on the host processor requesting (e.g. issuing a graphics API call or calls to request) a graphics processing operation that is to be performed by a subset of the stages of the graphics processing pipeline only; and the driver for the graphics processor executing on the host processor recognising the request (e.g. API call or calls) and causing the host processor to perform the processing operation that is to be performed by the subset of stages of the graphics processing pipeline.

Again, in this case, the graphics processing operation is in an embodiment performed on the host processor by, in effect, only using (performing the operations of) those graphics processing stages that correspond to the indicated subset of stages of the graphics processing pipeline (although as will be discussed further below, in this case, a modified version of the operation of those graphics processing stages can be used if desired).

In the case where the graphics processing operation that is to be performed by the subset of stages of the graphics processing pipeline is performed by the host processor, then in an embodiment it is the driver for the graphics processor that performs the graphics processing operation on the host processor.

Thus, in an embodiment, the driver is configured to be able to perform the graphics processing operation of the subset of stages of the graphics processing pipeline, e.g., and in an embodiment, by executing an appropriate program to perform that processing operation.

This will then allow, for example, graphics processing operations of certain subsets of the stages of the graphics processing pipeline to be performed on the host processor, rather than on the graphics processor itself. As will be discussed further below, this may have advantages, e.g., in terms of the latency for performing the graphics processing operations in question.

In an embodiment, as well as a graphics processing operation of a respective subset of stages of the graphics processing pipeline being able to be performed either on the graphics processor or on the host processor (e.g. by the driver on the host processor), it is also possible for one or more graphics processing operations that are performed by a stage or stages of the graphics processing pipeline to be performed by an application on the host processor (and in an embodiment by an application that is requesting the graphics processing) (and in an embodiment, this is what is done). In this case, the application can in an embodiment prepare data, such as, and in an embodiment, processed vertex data (e.g. processed vertex positions), that will then be used by the one or more subsets of the stages of the graphics processing pipeline that are implemented either on the graphics processor itself, and/or by the host processor (e.g. driver).

In an embodiment, there are two (at least two) sets of subsets of stages of the graphics processing pipeline that can be independently controlled and triggered in the manner of the technology described herein, with one of those sets of subsets of stages being able to be performed on the host processor (e.g., and in an embodiment, by the driver on the host processor), and the other subset of stages of the graphics processing pipeline being performed on the graphics processor. This will then facilitate, for example, distributing the different subsets of stages of the graphics processing pipeline between execution, e.g., in software, on the host processor, and by the graphics processor itself.

In an embodiment, a subset of stages of the graphics processing pipeline up to and including the tiling stage (the tiler) is able to be (and in an embodiment is) executed on the host processor (e.g., and in an embodiment, by the driver), with the processing stages after the tiling stage (e.g., and in an embodiment, from (and including) rasterisation and/or fragment processing onwards), being able to be (and in an embodiment being) performed on the graphics processor (e.g., and in an embodiment, by the driver issuing appropriate commands and data to the graphics processor to perform those processing stages).

In one such embodiment, an application that is requesting the graphics processing is operable to perform (and performs) vertex processing (and in an embodiment only or at least vertex position processing), and there is then a subset of stages of the graphics processing pipeline including primitive assembly and tiling stages that are executed on the host processor (e.g., and in an embodiment, by the driver) that use the processed vertex information to prepare tile lists for the render output being generated, and then a second subset of stages of the graphics processing pipeline that is executed on the graphics processor that uses the prepared tile lists to perform fragment processing to generate the render output. The second (fragment processing) subset of stages may also, e.g., use further processed vertex data (e.g. for non-position attributes) that has also been generated on the host processor, e.g., and in an embodiment, by the application that is requesting the graphics processing.

In this case therefore the, e.g. vertex shader and tiler, will be executed on the host processor, but with the results of the tiling process and the vertex shading process then being provided appropriately to the graphics processor for the remainder of its processing.

Where a subset of stages of the graphics processing pipeline is being executed on the host processor, e.g. in software, then while it would be possible for the execution of those stages simply to correspond exactly to how those stages would operate on the graphics processor (and in one embodiment this is what is done), the Applicants have recognised that because those stages are not being executed on the graphics processor itself, it would be possible to execute those stages on the host processor in a different manner. This can then facilitate, e.g., executing the stages on the host processor in, e.g., and in an embodiment, a manner that is more optimised for the graphics processing operation and use that is required, as compared, for example, to simply following the process for those stages that would be done if executing those stages on the graphics processor.

For example, when performing a subset of stages of the graphics processing pipeline on the host processor, one or more operations of the stages could, if desired, be (and in an embodiment are) disabled (omitted) as compared to those stages being executed on the graphics processor itself (where it is appropriate to do that). In one such embodiment, one or more of a graphics processing pipeline fixed function operations are disabled (omitted), such as clipping, perspective divide and/or viewpoint transformation.

In the case of vertex processing, for example, the vertex processing operation could be (and is in an embodiment), where applicable, simplified to, for example, use two dimensional vertex positions only, omit (skip) clipping and/or perspective divide operations, etc.

Thus, in an embodiment, when performing the processing operation of a subset of stages of the set of stages of the graphics processing pipeline on the host processor, the operation for that subset of stages is different to (not the same as) the operation that would be performed by that subset of stages if performing the processing operation on the graphics processor, and, in an embodiment, comprises a reduced or simplified set of operations as compared to the operations that would be performed when executing that processing operation using the subset of stages of the graphics processing pipeline on the graphics processor.

The operation in the manner of the technology described herein can be used for any suitable and desired graphics processing operation and for producing any suitable and desired graphics processing output.

The Applicants have recognised that the operation in the manner of the technology described herein may be particularly applicable where the operation of a subset of the stages of the graphics processing pipeline may be likely to produce the same result when performed plural times, e.g. for successive graphics processing outputs.

For example, the Applicants have recognised that it could be the case that the result of the tiling process could be the same for a sequence of frames to be rendered (e.g. where the geometry for the frame may be unlikely to change position over a sequence of frames). In this case, the technology described herein could be used to operate the subset of stages of the graphics processing pipeline up to the tiling stage only once, but then to trigger operation of the remaining subset of stages of the graphics processing pipeline after the tiling stage plural times, with each such instance of the operation of the subset of stages after the tiling stage using the tiling results (e.g. tile lists) from the single execution of the subset of stages of the graphics processing pipeline up to and including the tiling stage (the tiler). In an embodiment, this is what is done.

Thus, in an embodiment, the method of the technology described herein comprises:

an application executing on the host processor:

requesting a first graphics processing operation that is to be performed by a first subset of the set of stages of the graphics processing pipeline implemented by the graphics processor to be performed only once; and requesting a second graphics processing operation that is to be performed by a second, different subset of the set of stages of the graphics processing pipeline implemented by the graphics processor, and that is to use the results of the first graphics processing operation, to be performed multiple times; and the driver, in response to such requests from an application executing on the host processor:

causing the first graphics processing operation that is to be performed using the first subset of the set of stages of the graphics processing pipeline to be performed only once; and causing the second graphics processing operation that is to be performed using the second subset of the set of stages of the graphics processing pipeline to be performed multiple times, each time using the results of the first graphics processing operation.

Correspondingly, in an embodiment the driver of the graphics processing system is operable to, in response to requests from an application executing on the host processor for:

a first graphics processing operation that is to be performed by a first subset of the set of stages of the graphics processing pipeline implemented by the graphics processor to be performed only once; and a second graphics processing operation that is to be performed by a second, different subset of the set of stages of the graphics processing pipeline implemented by the graphics processor, and that is to use the results of the first graphics processing operation, to be performed multiple times:

cause the first graphics processing operation that is to be performed using the first subset of the set of stages of the graphics processing pipeline to be performed only once; and cause the second graphics processing operation that is to be performed using the second subset of the set of stages of the graphics processing pipeline to be performed multiple times, each time using the results of the first graphics processing operation.

In this case, the first graphics processing operation that is performed once in an embodiment produces as its results a set of tile lists indicating respective tiles of a render output that respective primitives are to be processed for, and the second graphics processing operation in an embodiment uses those tile lists to render the primitives listed in the tile lists. The first, e.g. tiling, graphics processing operation is in an embodiment carried out on the host processor, and the second, e.g. rendering, graphics processing operation is in an embodiment carried out on the graphics processor.

The Applicants have also recognised that the technology described herein may be particularly applicable where the geometry processing required for a render output (e.g. frame being rendered) is relatively lightweight, and/or where there may be latency issues when performing all of the processing of the graphics processing pipeline on the graphics processor itself in a single sequence that uses all of the stages of the graphics processing pipeline.

In this case, where there is a relatively lightweight geometry processing burden, that would then, potentially, facilitate offloading some or all of the geometry processing to be done on the host processor, rather than on the graphics processor, which may, e.g., have advantages in terms of the latency and/or timing of when that processing can be performed. As discussed above, the technology described herein facilitates this, by allowing an application to address and trigger graphics processing operations that use only a subset of the stages of the overall graphics processing pipeline.

Such relatively lightweight geometry processing, and it being advantageous to perform that geometry processing on the host processor, may arise, for example, in certain user interface cases (e.g. when rendering a relatively static user interface).

Thus, in an embodiment, the method of the technology described herein comprises:

an application executing on the host processor:

requesting a first graphics processing operation that is to be performed by a first subset of the set of stages of the graphics processing pipeline implemented by the graphics processor; and requesting a second graphics processing operation that is to be performed by a second, different subset of the set of stages of the graphics processing pipeline implemented by the graphics processor, and that is to use the results of the first graphics processing operation; and the driver, in response to such requests from an application executing on the host processor:

causing the first graphics processing operation that is to be performed using the first subset of the set of stages of the graphics processing pipeline to be performed; and causing the second graphics processing operation that is to be performed using the second subset of the set of stages of the graphics processing pipeline to be performed, using the results of the first graphics processing operation.

Correspondingly, in an embodiment the driver of the graphics processing system is operable to, in response to requests from an application executing on the host processor for:

a first graphics processing operation that is to be performed by a first subset of the set of stages of the graphics processing pipeline implemented by the graphics processor; and a second graphics processing operation that is to be performed by a second, different subset of the set of stages of the graphics processing pipeline implemented by the graphics processor, and that is to use the results of the first graphics processing operation:

cause the first graphics processing operation that is to be performed using the first subset of the set of stages of the graphics processing pipeline to be performed; and cause the second graphics processing operation that is to be performed using the second subset of the set of stages of the graphics processing pipeline to be performed using the results of the first graphics processing operation.

In this case, the first graphics processing operation is in an embodiment some form of geometry processing operation, such as producing a set of tile lists indicating respective tiles of a render output that respective primitives are to be processed for, and is in an embodiment performed on the host processor, and the second graphics processing operation is in an embodiment a rendering (fragment processing) operation, and is in an embodiment performed on the graphics processor.

In an embodiment, the operation in the manner of the technology described herein is used when performing rendering for a virtual reality display, and in particular for performing the "time warp" process when rendering for virtual reality display.

In a head mounted virtual reality display operation, for example, the appropriate images to be displayed to each eye will be rendered at a rate that matches the refresh rate of the display, such as 90 frames per second.

In such arrangements, the system will also operate to track the movement of the head of the user. This head orientation data is then used to determine how the images should actually be displayed to the user for their current head position (view direction), and the images (frames) are rendered accordingly (for example by setting the camera (viewpoint) orientation based on the head orientation data), so that an appropriate image based on the user's current direction of view can be displayed.

While it would be possible simply to determine the head orientation at the start of rendering a frame to be displayed in a VR system, because of latencies in the rendering process, it can be the case that the user's head orientation has changed between the sensing of the head orientation at the beginning of the rendering of the frame and the time when the frame is actually displayed (scanned out to the display panel).

To allow for this, a process known as "time warp" has been proposed for virtual reality head-mounted display systems. In this process, the frames to be displayed are rendered based on the head orientation data sensed at the beginning of the rendering of the frames, but then before the frames are actually displayed, further head orientation data is sensed, and that updated head sensor data is then used to render an "updated" version of the original frame that takes account of the updated head orientation data. The "updated" version of the frame is then displayed. This allows the image displayed on the display to more closely match the user's latest head orientation.

To do this processing, the initial, "application" frames are rendered into appropriate buffers, but there is then a second "time warp" rendering process that takes image data from those buffers, applies the latest head orientation data to the image data, and renders the image data to actually be displayed into the display buffer (e.g. the display front buffer) from where it will be scanned out for display, as the display panel is refreshed.

The later "time warp" rendering of the rendered application frames appropriately into the display buffer using the updated head orientation data should ideally be done as late as possible (i.e. just before the data is to be read out for display), so as to try to ensure that the images actually being displayed on the display are as accurate as possible for the user's currently determined head position.

For this processing, a graphics processor will accordingly be required to perform two different rendering tasks, one to render the frames as required and instructed by the application, and the other to then "time warp" render those rendered frames appropriately into the display buffer for scanning out for display based on the latest head orientation data.

The Applicants have recognised that in the case of the "time warp" rendering, while it is desirable that the fragment processing part of that rendering to render the output that will be displayed is done in response to sensing the head position and as late as possible in the rendering process, there are aspects of the time warp rendering processing, such as the initial geometry processing and consequent tiling operation in the case of a tile-based graphics processing pipeline, that are typically not in fact dependent upon the head position and could, if it were possible to do that, be executed independently of and in advance of the final "late sensing" of the head position data and rendering the "time warp" output. This is because, for example, it is typically the texture data that is to be used when rendering the frames in virtual reality displays that is updated based on the sensed head position, rather than the vertex positions themselves. Thus the Applicants have recognised that appropriate geometry and vertex position processing can be performed before the final head position data is determined, as it may only be the texture data (and/or other non-position vertex attributes) that is dependent upon the final head position data.

The technology described herein facilitates such operation, because it would allow the initial geometry processing and, e.g., tiling, to be triggered by an application separately to, and independently of, the final fragment processing to perform the time warp rendering.

Thus, in an embodiment, the method of the technology described herein comprises, when rendering images for display for a virtual reality display based on sensed head position data:
  the application that requires the rendering:
    requesting geometry processing of the geometry for an image to be rendered for display by a subset of the stages of the graphics processing pipeline that perform geometry processing, to be performed in advance of the sensing of the head position data for the rendering process; and
    requesting fragment processing for the image to be rendered to be performed by a subset of stages of the graphics processing pipeline that perform fragment processing to be performed using the result of the geometry processing and in response to and after the head position data has been sensed; and
  the driver for the graphics processor:
  in response to the requests from the application:
    causing the geometry processing operation that is to be performed by the subset of stages of the graphics processing pipeline to be performed prior to the head position data being sensed; and
    once the head position data has been sensed, causing the graphics processor to perform the fragment processing operation for the output to be rendered in accordance with the sensed head position data and using the result of the geometry processing.

Correspondingly, in an embodiment, the driver of the graphics processing system is operable to, in response to requests from an application executing on the host processor that requires the rendering of images for display based on sensed head position data for a virtual reality display for:
  geometry processing of the geometry for an image to be rendered for display by a subset of the stages of the graphics processing pipeline that perform geometry processing, to be performed in advance of the sensing of the head position data for the rendering process; and
  fragment processing for the image to be rendered to be performed by a subset of stages of the graphics processing pipeline that perform fragment processing to be performed using the result of the geometry processing and in response to and after the head position data has been sensed;
  cause the geometry processing operation that is to be performed by the subset of stages of the graphics processing pipeline to be performed prior to the head position data being sensed; and
  cause the graphics processor to perform the fragment processing operation for the output to be rendered once the head position data has been sensed in accordance with the sensed head position data and using the result of the geometry processing.

The rendering that is being performed based on the sensed head position data in these embodiments should be, and is in an embodiment, the rendering to "time warp" the frames appropriately into the display buffer for scanning out for display based on the latest head position data (as distinct, for example, from the main application frame rendering, which application frames are then to be "time warp" rendered into the display buffer based on the head position data). Correspondingly, the fragment processing operation that is performed once the head position data has been sensed should, and does in an embodiment, use new data (e.g., and in an embodiment, texture data and/or texture coordinates) that has been supplied based on the sensed head position in the fragment processing.

This operation will have the effect of reducing the number of graphics processing operations that need to be performed after the head position sensing for the time warp rendering, such that there will be reduced latency for the time warp rendering. This may be particularly significant and advantageous in the case of tile-based graphics processing pipelines, where it is necessary for all the geometry to be processed (so that the tiling can be completed) in order for the rendering to proceed. The technology described herein facilitates performing the necessary geometry processing for the tiling process before the final head position sensing, thereby removing the time required for performing the geometry processing and tiling from being after the (final) sensing of the head position. Thus, in an embodiment, the geometry processing includes a tiling operation and produces a set of tile lists.

The technology described herein is further advantageous for such applications, because, as discussed above, it can furthermore allow the geometry processing and, e.g., tiling, to be executed in software on the host processor, rather than those processes needing to be executed on the graphics processor itself. This can then avoid issues with regard to having to perform high priority preemption of existing operations that are being performed by the graphics processor when time warp rendering is to take place (it can, e.g., reduce or avoid having to pre-empt existing graphics processor operation for the higher priority time warp rendering tasks (for some or all of the higher priority time warp rendering tasks)). In particular, the technology described herein can avoid having to pre-empt any existing geometry processing being performed on the graphics processor to perform higher priority geometry processing for the time warp rendering output.

Thus, in an embodiment, the geometry processing and, e.g., tiling, is performed on the host processor (e.g., and in an embodiment, by the driver, and/or by the driver and application on the host processor), rather than those processes needing to be (and being) performed on the graphics processor itself.

The fragment processing on the other hand, is in an embodiment still performed on the graphics processor itself, with that fragment processing that is performed on the graphics processor using the results of the geometry processing (and tiling) that has already been performed.

Although the technology described herein has been described above with particular reference to the overall operation of the graphics processing system, the technology described herein also extends to the operation of the driver itself.

Thus, another embodiment of the technology described herein comprises a driver for a graphics processor, the graphics processor being operable to execute a graphics processing pipeline that comprises a set of plural graphics processing stages, the driver being operable to:

in response to requests for graphics processing received from an application executing on a host processor, provide commands and data to an associated graphics processor to control the graphics processor to perform graphics processing operations;

and further being operable to:

in response to a request from an application executing on a host processor for a graphics processing operation that is to be performed by only a subset of the set of stages of the graphics processing pipeline implemented by a graphics processor:

cause the graphics processing operation that is to be performed using only a subset of the set of stages of the graphics processing pipeline to be performed.

As will be appreciated by those skilled in the art, this embodiment of the technology described herein can, and in an embodiment does, comprise any one or more or all of the in an embodiment and optional features of the technology described herein described herein, as appropriate.

Thus, for example, the driver is in an embodiment operable to cause the graphics processing operation that is to be executed using only a subset of the set of stages of the graphics processing pipeline to be performed on the host processor (e.g., and in an embodiment, by the driver itself), or to be performed by the associated graphics processor. Similarly, the driver can in an embodiment cause respective graphics processing operations that are each to be performed using only a respective subset of the set of stages of the graphics processing pipeline to be performed.

The render output to be generated may comprise any render output that is to be generated by the graphics processing pipeline. The technology described herein can be used for all forms of output that a graphics processing pipeline may be used to generate, such as frames for display, render-to-texture outputs, etc. In an embodiment, the render output is an output frame (which may then be displayed).

The host processor of the graphics processing system can be any suitable and desired host processor (CPU) for a graphics processing system. It should be, and is in an embodiment, operable to execute applications that may require graphics processing and a driver for the graphics processor of the data processing system. The host processor can otherwise function as desired (and include functional units as desired).

The graphics processor can correspondingly be any suitable and desired graphics processor that can perform rendering tasks and that implements a graphics processing pipeline. In an embodiment the graphics processor is a tile-based graphics processing unit, but other arrangements would be possible, if desired.

The graphics processing system may also comprise, and in an embodiment does also comprise, and/or is in communication with, one or more memories and/or memory devices that store the data described herein, and/or that store software for performing the processes described herein. In an embodiment the graphics processing system includes a main memory that can store one or more frame buffers that store output frames rendered by the graphics processor.

The graphics processor and/or host microprocessor are in an embodiment also in communication with a display for displaying the images generated by the graphics processing pipeline (thus in an embodiment the graphics processing system further comprises a display for displaying the images generated by the graphics processing pipeline).

The technology described herein can be implemented in any suitable system, such as a suitably configured microprocessor based system. In some embodiments, the technology described herein is implemented in computer and/or micro-processor based system.

The technology described herein is in an embodiment implemented in a portable device, such as, and in an embodiment, a mobile phone or tablet.

It is believed that the technology described herein would be particularly applicable to virtual reality display devices such as virtual reality headsets. Thus, another embodiment of the technology described herein comprises a virtual reality display device comprising the graphics processing system of any one or more of the embodiments of the technology described herein. Correspondingly, another embodiment of the technology described herein comprises a method of operating a virtual reality display device, comprising operating the virtual reality display device in the manner of any one or more of the embodiments of the technology described herein.

The various functions of the technology described herein can be carried out in any desired and suitable manner. For example, the functions of the technology described herein can be implemented in hardware or software, as desired. Thus, for example, the various functional elements, stages and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

An embodiment of the technology described herein in the context of time warp rendering for a virtual reality display using a tile-based graphics processor will now be described.

Figure 2:
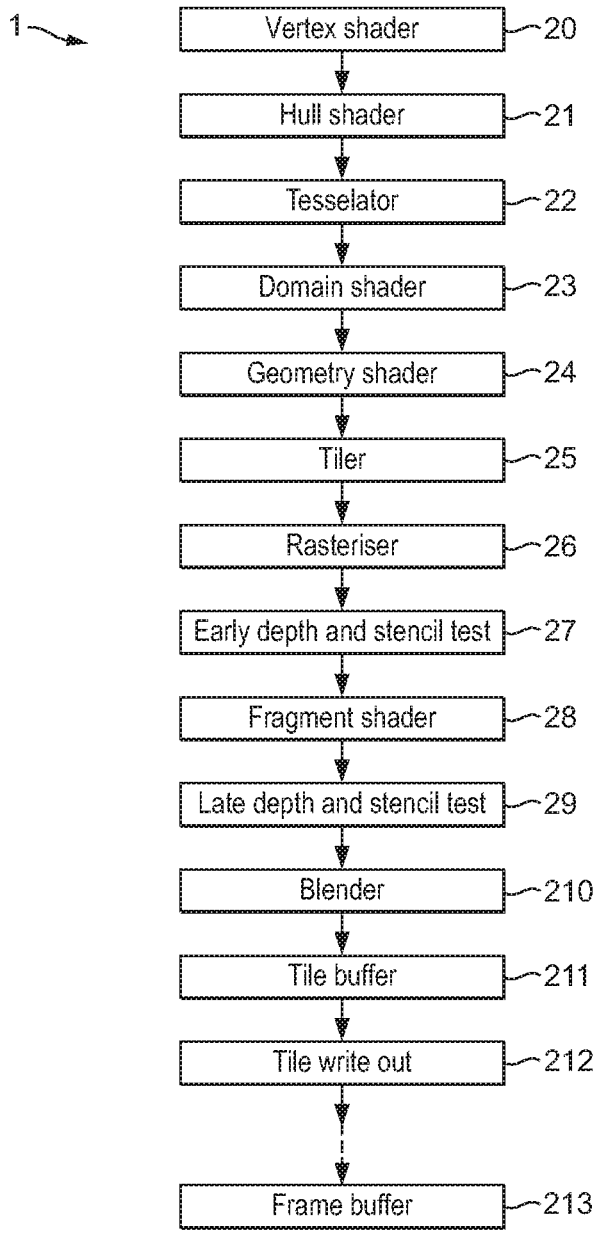
Figure 3:
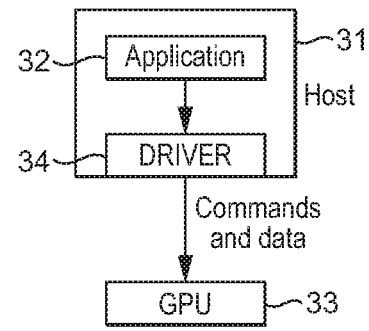
FIG. 3 shows an exemplary computer graphics processing system.
Figure 4:
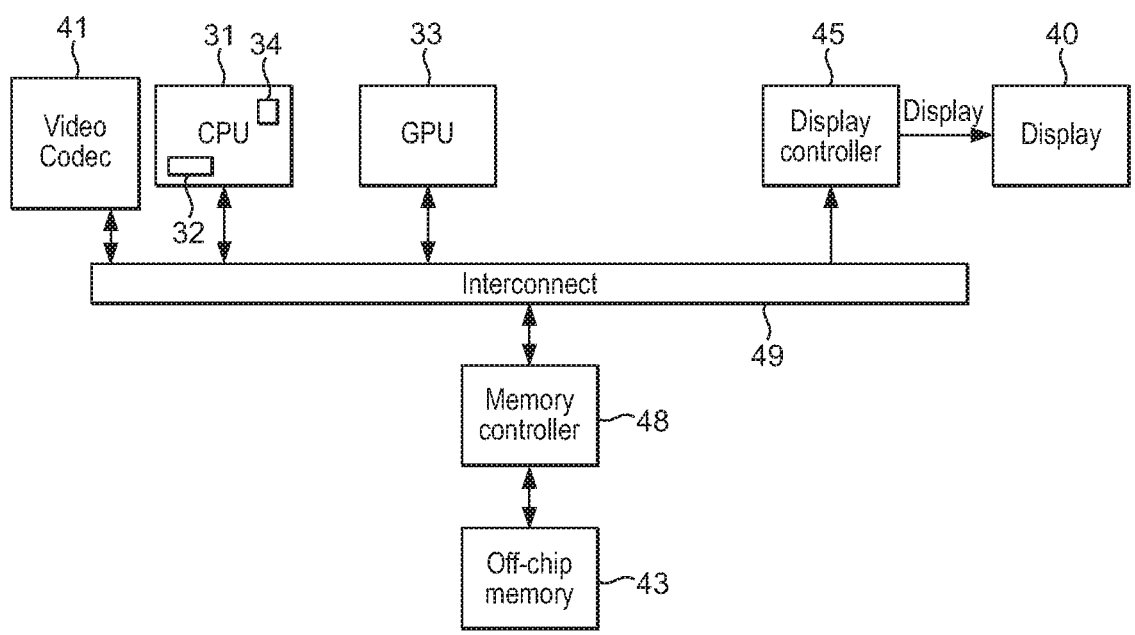
FIG. 4 shows schematically a data processing system that can be operated in accordance with an embodiment of the technology described herein.

FIG. 4 shows an exemplary virtual reality display data processing system that comprises a host processor comprising a central processing unit (CPU) 31, a graphics processing unit (GPU) 33, a video codec 41, a display controller 45, and a memory controller 48. The graphics processor 33 will implement a graphics processing pipeline, e.g. as shown in FIGS. 2 and 3.

As shown in FIG. 4, these units communicate via an interconnect 49 and have access to off-chip memory 43. In this system the GPU 33, video codec 41 and/or CPU 31 will generate frames (images) to be displayed and the display controller 45 will then provide the frames to a display 40 for display.

In use of this system, an application 32 such as a game, executing on the host processor (CPU) 31 will, for example, require the display of frames on the display 40. To do this, the application 32 will submit appropriate commands and data to a driver 34 for the graphics processing unit 33 that is executing on the CPU 31. The driver 34 will then generate appropriate commands and data to cause the graphics processing unit 33 to render appropriate frames for display and to store those frames in appropriate frame buffers, e.g. in the main memory 43. The display controller 45 will then read those frames into a buffer for the display from where they are then read out and displayed on the display panel of the display 40.

As discussed above, in the case of "time warp slice" rendering for a virtual reality (VR) head mounted display (HMD) system, the host processor 31 will control the graphics processor 33 to render respective left and right frames to be displayed at a rate corresponding to the refresh rate of the display 40 that the images are to be displayed upon, and to, in parallel with this, render all or parts of those frames to the display for display (e.g. into the display front buffer for scan out for display on the display) at appropriate intervals to try to ensure that the images displayed to the user on the display are as appropriate for the user's current head position (view direction) as possible.

For this processing, the graphics processor 33 will accordingly be required to perform two different rendering tasks, one to render the frames as required and instructed by the application, and the other to then render those rendered frames appropriately, e.g. into the display buffer for scanning out, for display based on the latest head orientation data. Both of these rendering operations will be performed by the graphics processor 33 of the overall data processing system, under the control of the host processor (CPU) 31 of the data processing system.

The present embodiment is concerned with the second of these rendering processes, namely the rendering of the "time warp" slices of the images (frames) that are required by the application to be displayed based on the latest head orientation data into, e.g., the display buffer for scanning out for display.

Figure 5:
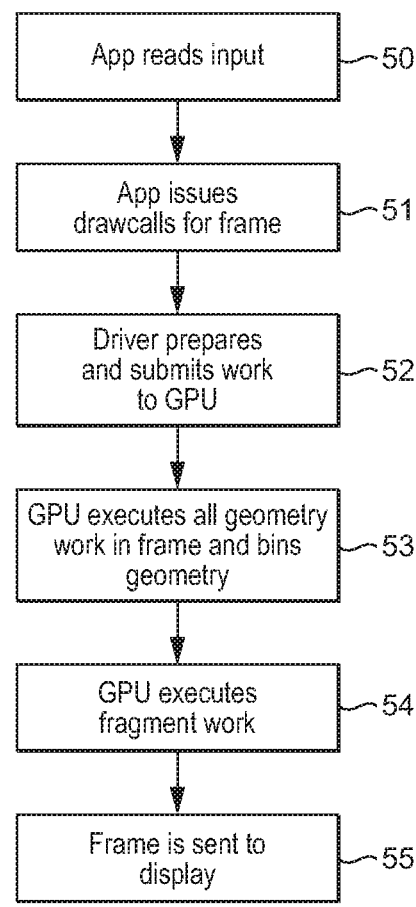
FIGS. 5 and 6 illustrate conventional time warp rendering.

FIG. 5 shows schematically the conventional operation when performing virtual reality time warp rendering on a tile-based graphics processing unit.

As shown in FIG. 5, in this conventional operation, the application requiring the time warp rendering will read the relevant head position information, etc. (step 50), and in response to that issue the appropriate draw calls for rendering the time warp frame (step 51). In response to this, the driver for the graphics processor will prepare and submit the necessary rendering work to the graphics processing unit (graphics processor) (step 52). The graphics processing unit will then execute all the geometry work in the frame and bin (tile) the geometry (step 53), and following that tiling process, execute the fragment processing work (step 54). Following this, the frame for the time warp display is sent to the display (step 55).

Figure 6:
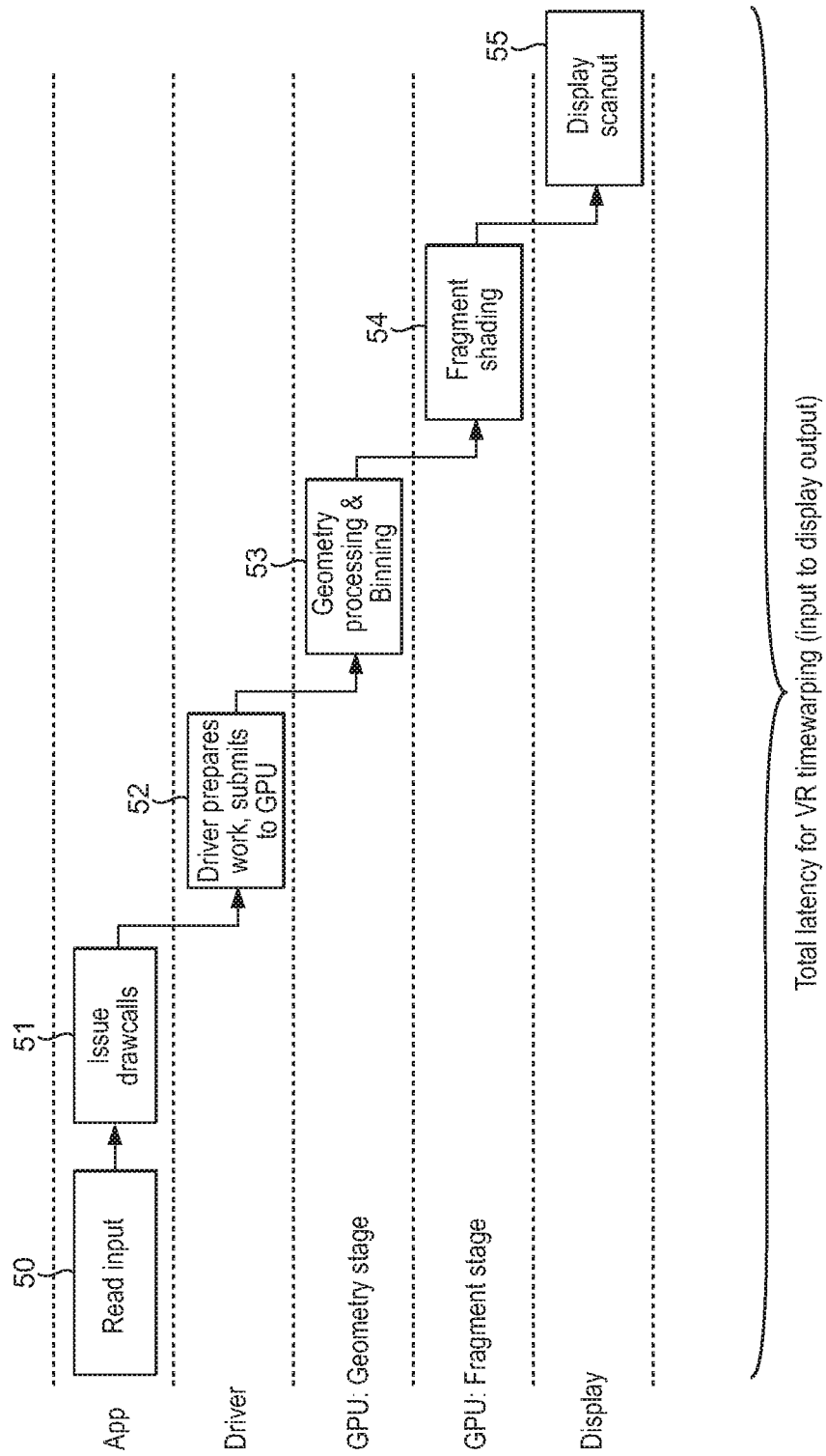

FIG. 6 is a corresponding timeline diagram showing schematically the time taken for the various processes shown in FIG. 5 and to display the time warp frame.

FIGS. 7-10 show the corresponding time warp rendering operation on a tile-based graphics processing unit in an embodiment of the technology described herein.

In this embodiment, the set of stages of the graphics processing pipeline is divided into two subsets of stages that can each be executed independently.

The first subset of stages comprises primitive processing stages up to and including the generation of the tile lists. This is shown in FIG. 7, and as can be seen from that figure, comprises a subset of stages of the graphics processing pipeline that the application can control and trigger, which takes as its inputs transformed vertex positions 60 and primitive data 61, and performs the necessary primitive processing 62 to generate tile lists 63 for the time warp frame being rendered.

In the present embodiment, this subset of stages of the overall graphics processing pipeline is executed in software by the driver 34 for the graphics processing unit 33 on the host processor 31 in response to the relevant application calls from the application 32.

The other subset of stages of the graphics processing pipeline in the present embodiment that can be independently accessed and triggered by the application comprises those processing stages that follow the preparation of the tile lists (and that will use the tile lists as an input), namely the rasterisation, fragment processing and blending stages.

Figure 7:
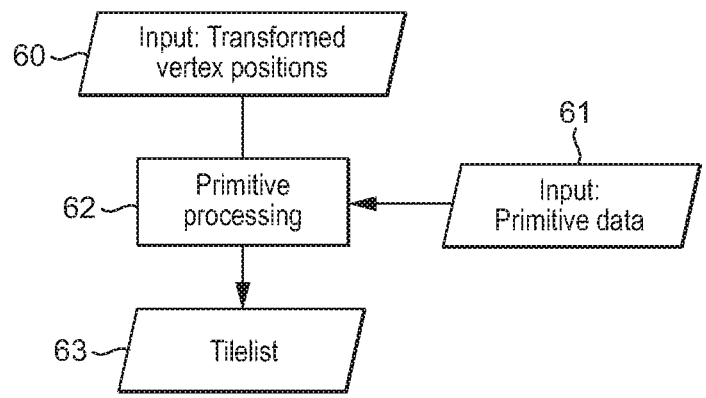
FIGS. 7 to 10 illustrate time warp rendering in an embodiment of the technology described herein.
Figure 8:
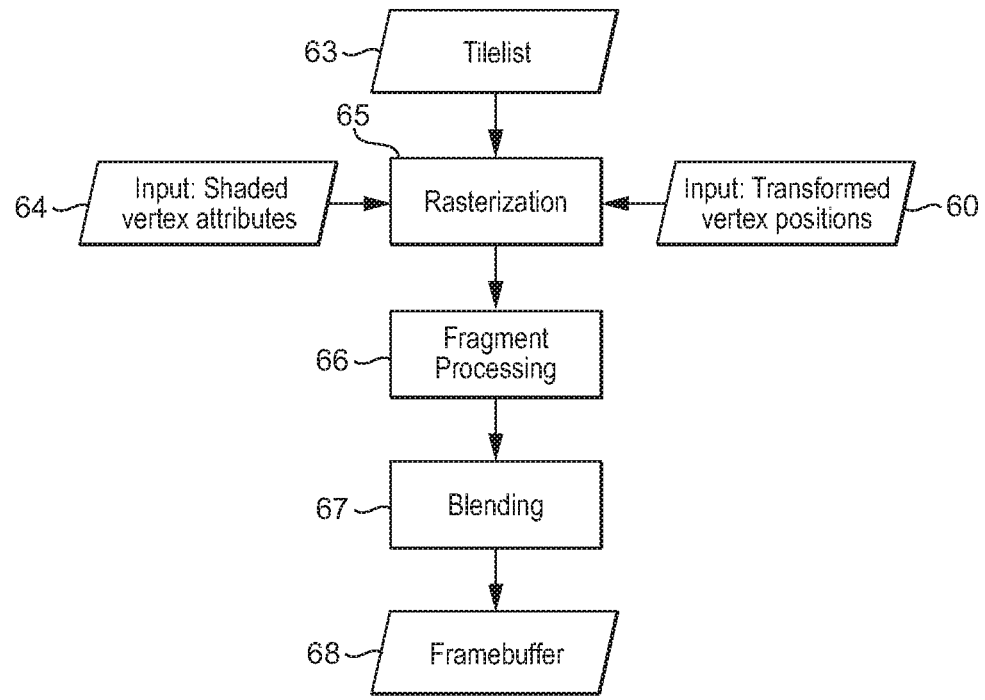

This is shown in FIG. 8, and as can be seen from that figure, takes the tile lists 63 prepared by the first subset of stages shown in FIG. 7, appropriately shaded vertex attributes 64, and the transformed vertex positions 60, and then performs the necessary rasterisation 65, fragment processing 66 and blending 67 operations to produce the time warp frame that is then written out to the frame buffer 68 for display. These operations are carried out on the graphics processing unit 33 itself.

The shaded vertex attributes 64 can be provided as desired. In the present embodiment the application is able to submit a buffer which is used as the shaded vertex attributes (which will be texture coordinates in the time warp use case). Other arrangements would, of course, be possible.

Also, although the transformed vertex positions 60 are shown as a separate input in FIG. 8, those vertex positions could be otherwise provided, such as by being recorded as part of the tile lists 63, if desired.

Figure 9:
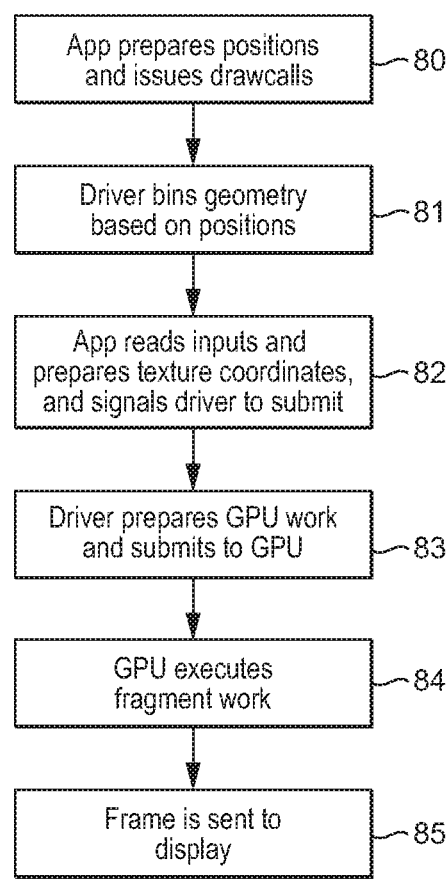

FIG. 9 shows the sequence of operations in this embodiment of the technology described herein (corresponding to the operation illustrated in FIG. 5).

As can be seen from FIG. 9, in this embodiment of the technology described herein, the first stage in the process is for the application requiring the time warp rendering to prepare the vertex positions for the geometry to be rendered and to issue draw calls (step 80) to command the driver 34 for the graphics processing unit 33 to perform the geometry and tile list preparing subset of operations illustrated in FIG. 7.

At this stage the driver may, e.g., specify the addresses of the necessary data buffers, such as the vertex buffer and the texture coordinate buffer for the time warp rending (e.g. if that is necessary to be consistent with the graphics API), but it need not necessarily be the case, for example in the case of the texture coordinate buffer, that the content of those buffers is specified at this stage, as the first subset of stages of the graphics processing pipeline that is performing this operation will not be using that, e.g., texture coordinate information.

In response to this, the driver prepares the tile lists for the time warp frame (step 81).

In the present embodiment, the application prepares the vertex positions using a modified and optimised vertex shading process as compared to the vertex shading that would be performed by the vertex shader on the graphics processor 33. For example, the application may perform the vertex processing using 2D vertex output positions only, and/or may skip (omit) vertex processing operations, such as clipping, perspective divide and viewport transformations, if desired.

Correspondingly, the tiling operation performed by the driver may also be modified as compared to the tiling operation that would be implemented on the graphics processing unit 33. For example, the tiling operation performed by the driver may be simplified by forcing the vertex position coordinate W to always be 1 so that the tiling operation performed by the driver doesn't have to handle inverted primitives.

This is possible because by no longer performing these operations on the graphics processing unit 33, they can be modified from the way that they would be performed on the graphics processing unit 33.

The process then waits until the application senses the head position information for the time warp rendering, at which point the application prepares the texture coordinates to be used for the time warp rendering (as those texture coordinates are typically dependent upon the head position), and then signals the driver to submit the fragment processing work for the time warp frame to the graphics processing unit for processing (step 82). At this point the, e.g. previously defined, texture coordinate buffers will now contain valid content that can be used for the fragment processing operation.

In response to this, as shown in FIG. 9, the driver now prepares the fragment processing work for the time warp frame to be performed by the graphics processing unit, and submits that work appropriately to the graphics processing unit (step 83). This will include the texture coordinates and tile list information that has previously been prepared by the driver and application.

In response to this, the graphics processing unit 33 then performs the necessary fragment processing work to render the time warp frame, i.e. executes the subset of stages of the graphics processing pipeline as indicated in FIG. 8 (step 84).

The so-rendered frame is then sent to the display for display (step 85).

Figure 10:
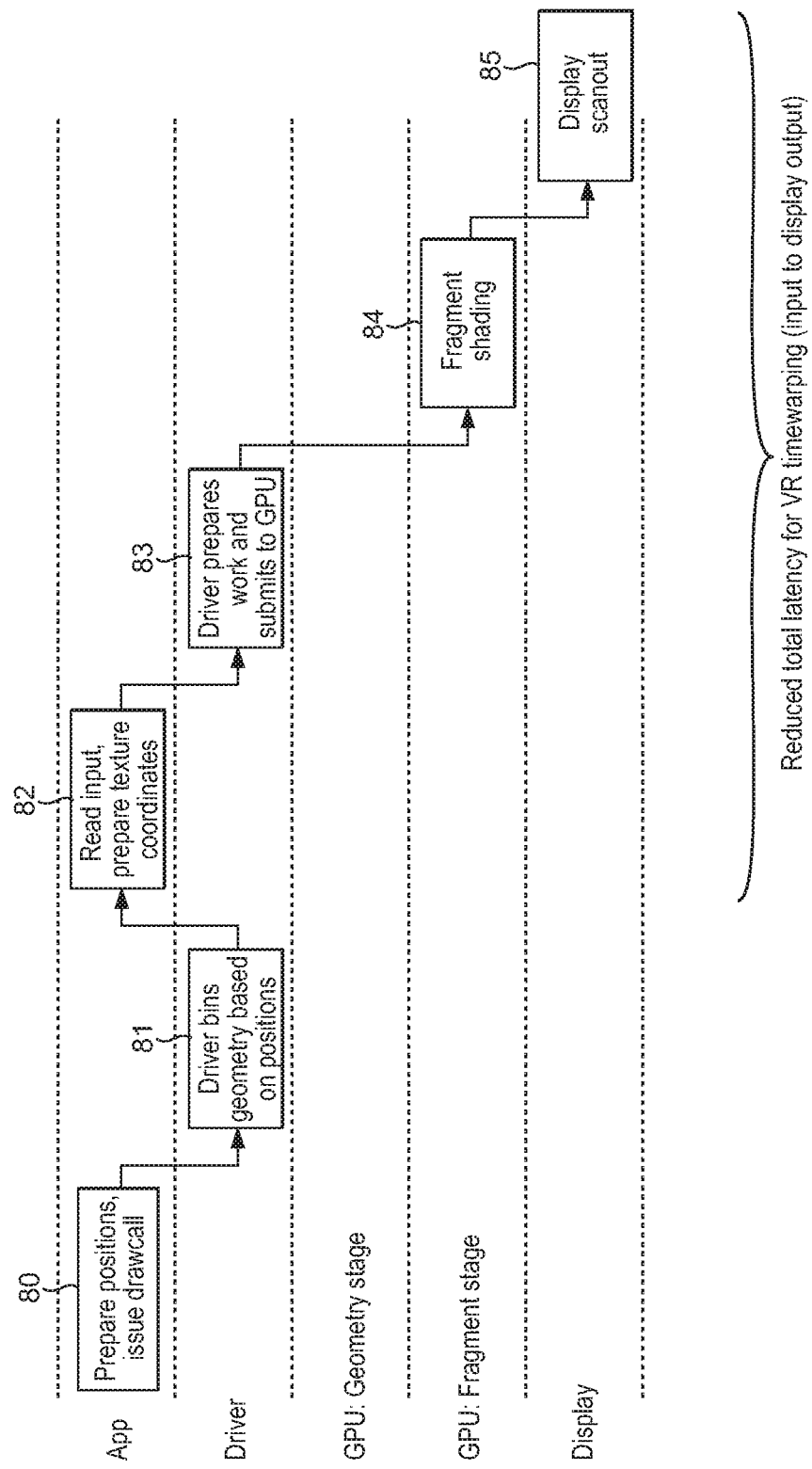

FIG. 10 is a timeline diagram for this operation in the present embodiment (corresponding to the timeline operation for conventional time warp rendering shown in FIG. 6).

As shown in FIG. 10, both the preparation of the initial vertex positions 80 and the tiling operation 81 are in the present embodiment performed in advance of the application reading the head position information 82 and preparing any data that is dependent upon that head position information. Correspondingly, the only processing that takes place on the graphics processing unit itself is the fragment shading 84, and that is done after the application has read the head position information and prepared any data such as the texture coordinates that is dependent on that information. The effect of this then is, as shown in FIG. 10 and as can be seen from comparison with FIG. 6, that the total latency for the time warp display counted from the application reading the head position information to the output of the time warp display is reduced as compared with the conventional arrangement shown in FIG. 6.

The above operation in the present embodiments is controlled by the use of appropriate graphics API (Application Program Interface) calls issued by the application that requires the time warp rendering.

A pseudo-code example for this, in a graphics API, is shown below:
   bindPositionBuffer (P1);
   bindShadedAttributeBuffer (A);
   draw( ); /* Driver tiles positions on CPU, but does not access the attributes in buffer A */
   bindPositionBuffer (P2);
   bindShadedAttributeBuffer (B);
   draw ( );
   /*Application late-latches input, and update buffers A, B */
   submit ( ); /* GPU rendering is kicked off. Contents of A and B are expected to be valid at this point */

Although the present embodiment has been described with particular reference to the use of the techniques of the technology described herein when performing time warp rendering for a virtual reality display, the principles and operation of the technology described herein and embodiments can correspondingly be applied to other rendering operations and tasks, if desired.

For example, in the case of rendering operations that have relatively "lightweight" geometry (e.g. a few thousand primitives only, such as might be the case for a user interface, then it may equally be advantageous to perform the tiling process in the driver on the host processor, thereby saving the graphics processing unit from even starting the tiler (with the fragment processing then being performed on the graphics processing unit, using the prepared tile lists).

This may also help to reduce latency in these circumstances.

Other arrangements would, of course, be possible.

It can be seen from the above, that the technology described herein in its embodiments at least, can provide improved graphics processing pipeline operations, and in particular can reduce latency for certain graphics rendering situations.

This is achieved, in embodiments of the technology described herein at least, by allowing an application to trigger and control graphics processing operations that are performed by a subset of the stages of the overall graphics processing pipeline only. This then facilitates, for example, distributing the overall operation of the graphics processing pipeline between the host processor and a graphics processor, and/or allows different subsets of stages of the graphics processing pipeline to be decoupled in time.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a tile-based graphics processing system, which tile-based graphics processing system includes:
   a host processor operable to execute applications that require graphics processing; and
   a tile-based graphics processor, the tile-based graphics processor operable to execute a graphics processing pipeline that comprises a set of plural graphics processing stages including a first subset of the set of graphics processing stages that prepares tile lists for a render output to be generated, and a second subset of the set of graphics processing stages that uses the prepared tile lists to perform fragment processing to generate the render output;
   wherein the host processor executes a driver for the tile-based graphics processor, the driver being operable to, in response to requests for graphics processing received from an application executing on the host processor, provide commands and data to the tile-based graphics processor to control the tile-based graphics processor to perform graphics processing operations;
the method comprising:
when rendering images for display in a virtual reality display based on sensed head position data:
an application executing on the host processor that requires the rendering:
   issuing a first request to the driver for tile lists to be prepared for a render output to be generated in advance of the sensing of the head position data for the rendering process; and
   issuing a second request to the driver for fragment processing to be performed for the render output in response to and after the head position data has been sensed and using the tile lists prepared in response to the first request; and the driver for the tile-based graphics processor:
- in response to the first request from the application executing on the host processor, preparing the tile lists for the render output prior to the head position data being sensed; and
- in response to the second request from the application executing on the host processor, causing the tile-based graphics processor to perform the fragment processing for the render output once the head position data has been sensed, using data that is based on the sensed head position data and using the tile lists prepared by the driver in response to the first request.

2. The method of claim 1, further comprising:
the application executing on the host processor indicating with the second request for fragment processing, an event that is to trigger the performance of the fragment processing; and
the driver causing the fragment processing to be performed in response to the indicated event occurring.

3. The method of claim 1, further comprising:
the driver preparing the tile lists once in response to the first request from the application; and
the driver then causing the fragment processing to be performed by the tile-based graphics processor plural times using the tile lists that are prepared by the driver once.

4. The method of claim 1, further comprising:
the application executing on the host processor performing vertex processing to generate processed vertex information; and
the driver for the tile-based graphics processor, in response to the first request from the application executing on the host processor, preparing the tile lists for the render output using the processed vertex information generated by the application executing on the host processor.

5. A tile-based graphics processing system comprising:
a host processor operable to execute applications that require graphics processing; and
a tile-based graphics processor, the tile-based graphics processor operable to execute a graphics processing pipeline that comprises a set of plural graphics processing stages including a first subset of the set of graphics processing stages that prepares tile lists for a render output to be generated, and a second subset of the set of graphics processing stages that uses the prepared tile lists to perform fragment processing to generate the render output;
wherein:
the host processor is operable to execute a driver for the tile-based graphics processor, the driver being operable to, in response to requests for graphics processing received from an application executing on the host processor, provide commands and data to the tile-based graphics processor to control the tile-based graphics processor to perform graphics processing operations;
and the driver for the tile-based graphics processor is further operable to:
in response to a first request from an application executing on the host processor that requires the rendering of images for display based on sensed head position data for a virtual reality display for tile lists to be prepared for a render output to be generated in advance of the sensing of the head position data for the rendering process, prepare the tile lists for the render output prior to the head position data being sensed; and
in response to a second request from the application executing on the host processor for fragment processing to be performed for the render output in response to and after the head position data has been sensed and using the tile lists prepared in response to the first request, cause the tile-based graphics processor to perform the fragment processing for the render output once the head position data has been sensed, using data that is based on the sensed head position data and using the tile lists prepared by the driver in response to the first request.

6. The system of claim 5, wherein:
an application can indicate with the second request for fragment processing, an event that is to trigger the performance of the fragment processing; and
the driver is further operable to cause the fragment-processing to be performed in response to the indicated event occurring.

7. The system of claim 5, wherein:
the driver is operable to prepare the tile lists once in response to the first request from the application; and to then cause the fragment processing to be performed by the tile-based graphics processor plural times using the tile lists that are prepared by the driver once.

8. The system of claim 5, wherein:
the application executing on the host processor is operable to perform vertex processing to generate processed vertex information; and
the driver for the tile-based graphics processor is operable to, in response to the first request from the application executing on the host processor, prepare the tile lists for the render output using processed vertex information generated by the application executing on the host processor.

9. A non-transitory computer readable storage medium storing computer software code which when executing on a processor performs a method of operating a driver for a tile-based graphics processor, the tile-based graphics processor being operable to execute a graphics processing pipeline that comprises a set of plural graphics processing stages including a first subset of the set of graphics processing stages that prepares tile lists for a render output to be generated, and a second subset of the set of graphics processing stages that uses the prepared tile lists to perform fragment processing to generate the render output, the method comprising:
the driver for the tile-based graphics processor:
- in response to requests for graphics processing received from an application executing on a host processor, providing commands and data to an associated tile-based graphics processor to control the tile-based graphics processor to perform graphics processing operations;
- in response to a first request from an application executing on a host processor that requires the rendering of images for display based on sensed head position data for a virtual reality display for tile lists to be prepared for a render output to be generated in advance of the sensing of the head position data for the rendering process, preparing the tile lists for the render output prior to the head position data being sensed; and
- in response to a second request from the application executing on the host processor for fragment processing to be performed for the render output in response to and after the head position data has been sensed and using the tile lists prepared in response to the first request, causing the tile-based graphics processor to perform the fragment processing for the render output once the head position data has been sensed, using data that is based on the sensed head position data and using the tile lists prepared by the driver in response to the first request.

10. A method of operating a tile-based graphics processing system, which tile-based graphics processing system includes:
a host processor operable to execute applications that require graphics processing; and
a tile-based graphics processor, the tile-based graphics processor operable to execute a graphics processing pipeline that comprises a set of plural graphics processing stages including a first subset of the set of graphics processing stages that prepares tile lists for a render output to be generated, and a second subset of the set of graphics processing stages that uses the prepared tile lists to perform fragment processing to generate the render output;
wherein the host processor executes a driver for the tile-based graphics processor, the driver being operable to, in response to requests for graphics processing received from an application executing on the host processor, provide commands and data to the tile-based graphics processor to control the tile-based graphics processor to perform graphics processing operations;
the method comprising:
an application executing on the host processor:
performing vertex processing to generate processed vertex information;
issuing a first request to the driver for tile lists to be prepared for a render output to be generated; and
issuing a second request to the driver for fragment processing to be performed for the render output using the tile lists prepared in response to the first request; and
the driver for the tile-based graphics processor:
in response to the first request from the application executing on the host processor, preparing the tile lists for the render output using the processed vertex information generated by the application executing on the host processor; and
in response to the second request from the application executing on the host processor, causing the tile-based graphics processor to perform the fragment processing for the render output using the tile lists prepared by the driver in response to the first request.

11. A tile-based graphics processing system comprising:
a host processor operable to execute applications that require graphics processing; and
a tile-based graphics processor, the tile-based graphics processor operable to execute a graphics processing pipeline that comprises a set of plural graphics processing stages including a first subset of the set of graphics processing stages that prepares tile lists for a render output to be generated, and a second subset of the set of graphics processing stages that uses the prepared tile lists to perform fragment processing to generate the render output;
wherein:
the host processor is operable to execute a driver for the tile-based graphics processor, the driver being operable to, in response to requests for graphics processing received from an application executing on the host processor, provide commands and data to the tile-based graphics processor to control the tile-based graphics processor to perform graphics processing operations;
the application executing on the host processor is operable to perform vertex processing to generate processed vertex information;
and the driver for the tile-based graphics processor is further operable to:
in response to a first request from the application executing on the host processor for tile lists to be prepared for a render output to be generated, prepare the tile lists for the render output using processed vertex information generated by the application executing on the host processor; and
in response to a second request from the application executing on the host processor for fragment processing to be performed for the render output using the tile lists prepared in response to the first request, cause the tile-based graphics processor to perform the fragment processing for the render output using the tile lists prepared by the driver in response to the first request.

12. A non-transitory computer readable storage medium storing computer software code which when executing on a processor performs a method of operating a tile-based graphics processing system, which tile-based graphics processing system includes:
a host processor operable to execute applications that require graphics processing; and
a tile-based graphics processor, the tile-based graphics processor operable to execute a graphics processing pipeline that comprises a set of plural graphics processing stages including a first subset of the set of graphics processing stages that prepares tile lists for a render output to be generated, and a second subset of the set of graphics processing stages that uses the prepared tile lists to perform fragment processing to generate the render output;
wherein the host processor executes a driver for the tile-based graphics processor, the driver being operable to, in response to requests for graphics processing received from an application executing on the host processor, provide commands and data to the tile-based graphics processor to control the tile-based graphics processor to perform graphics processing operations;
the method comprising:
an application executing on the host processor:
performing vertex processing to generate processed vertex information;
issuing a first request to the driver for tile lists to be prepared for a render output to be generated; and
issuing a second request to the driver for fragment processing to be performed for the render output using the tile lists prepared in response to the first request; and
the driver for the tile-based graphics processor:
in response to the first request from the application executing on the host processor, preparing the tile lists for the render output using the processed vertex information generated by the application executing on the host processor; and
in response to the second request from the application executing on the host processor, causing the tile-based graphics processor to perform the fragment processing for the render output using the tile lists prepared by the driver in response to the first request.

* * * * *